UNITED STATES PATENT OFFICE.

ROBERT C. SHEAFFER, OF LANCASTER, PENNSYLVANIA.

COMPOSITION FOR BUILDING BLOCKS.

No Drawing.    Application filed July 16, 1921. Serial No. 485,397.

*To all whom it may concern:*

Be it known that I, ROBERT C. SHEAFFER, a citizen of the United States, residing at Lancaster, in the county of Lancaster and State of Pennsylvania, have invented certain new and useful Improvements in Composition for Building Blocks, of which the following is a specification.

This invention relates to compounds and more particularly to compositions used in the production of building blocks and the like.

The principal object of the invention is to provide a block which will not only have the requisite strength but which will be comparatively light and which will be substantially sound proof.

Another object of the invention is to provide a compound for use in the production of building blocks, bricks and so forth, which will be fireproof and at the same time adapted to absorb moisture so as to prevent dampness in the building.

Further objects of the invention will appear as the following specific description is read.

In the specific embodiment of my invention as described herein, I combine ashes, cement, cork and silicate of soda, and in bringing these elements together I preferably employ the following steps:

The ashes are first ground or crushed so as to pass through a half inch mesh screen or sieve and the silicate of soda is diluted with water in the proportion of one part silicate of soda to seven parts of water. After the ashes are crushed, they are mixed with the cement and cork in the following proportions:

| | |
|---|---|
| Ashes | 100 lbs. |
| Cement | 60 " |
| Cork | 1 " |

To this dry mixture I add the diluted silicate of soda and a sufficient quantity of water to enable me to make a semi-plastic composition which is moulded into blocks, of any desired shape or size.

I preferably use the ashes from bituminous coal which are light and yet have no tendency to disintegrate like the ashes of anthracite coal and are comparatively strong so that the block when completed will be easily handled and not cumbersome like the blocks constructed of cement, sand and gravel. These blocks will also have somewhat greater porosity than ordinary concrete blocks and, therefore, will insure a drier building than could possibly be obtained with the usual block construction.

The cork combined with the ashes makes it possible to drive nails of either the smallest or largest pennyweight into a block without cracking the same and such nails will hold as firmly as though driven in wood.

I claim:

1. A composition for producing building blocks comprising the following ingredients mixed in the proportions named: ashes 100 lbs., cement 60 lbs., and cork 1 lb.

2. A composition for producing building blocks comprising the following ingredients mixed in the proportions named: ashes 100 lbs., cement 60 lbs., cork 1 lb., silicate of soda diluted one part to seven parts of water.

In testimony whereof I hereunto affix my signature.

ROBERT C. SHEAFFER.